(12) United States Patent
Ohkubo et al.

(10) Patent No.: US 11,347,089 B2
(45) Date of Patent: May 31, 2022

(54) LIGHT CONTROL DEVICE

(71) Applicant: TOPPAN PRINTING CO., LTD., Tokyo (JP)

(72) Inventors: Wataru Ohkubo, Taito-ku (JP); Masanori Sakamoto, Taito-ku (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/208,463

(22) Filed: Mar. 22, 2021

(65) Prior Publication Data

US 2021/0208437 A1 Jul. 8, 2021

Related U.S. Application Data

(63) Continuation of application No. PCT/JP2019/037083, filed on Sep. 20, 2019.

(30) Foreign Application Priority Data

Sep. 21, 2018 (JP) .............................. JP2018-177659

(51) Int. Cl.
  *G02F 1/133* (2006.01)
  *G09G 3/00* (2006.01)
  (Continued)

(52) U.S. Cl.
  CPC ............ G02F 1/13306 (2013.01); E06B 9/24 (2013.01); G02F 1/137 (2013.01);
  (Continued)

(58) Field of Classification Search
  None
  See application file for complete search history.

(56) References Cited

U.S. PATENT DOCUMENTS 8,094,118 B2 * 1/2012 Pedram ................ G09G 3/3696
  345/102
2010/0194299 A1 * 8/2010 Ye .......................... H05B 45/38
  315/192

(Continued)

FOREIGN PATENT DOCUMENTS

JP 2018-060128 A 4/2018

OTHER PUBLICATIONS

International Search Report dated Nov. 19, 2019 in PCT/JP2019/037083, filed Sep. 20, 2019.
(Continued)

*Primary Examiner* — Ryan Crockett
(74) *Attorney, Agent, or Firm* — Oblon, McClelland, Maier & Neustadt, L.L.P.

(57) ABSTRACT

A light control device including a drive voltage output unit that outputs a drive voltage, a control unit that causes the drive voltage output unit to gradually increase or gradually decrease a magnitude of the drive voltage, a light control sheet including light control units connected in parallel to the drive voltage output unit and formed such that light transmittances of the light control units change according to magnitudes of voltages applied to the light control units, and a voltage dividing circuit which is connected to one of the light control units and divides the drive voltage common to each of the light control units such that the magnitude of the voltage applied to the light control unit connected to the voltage dividing circuit differs from the magnitude of the voltage applied to at least one of other light control units.

11 Claims, 7 Drawing Sheets

(51) Int. Cl.
  *E06B 9/24*    (2006.01)
  *G02F 1/1343*   (2006.01)
  *G02F 1/137*    (2006.01)

(52) U.S. Cl.
  CPC .......... *G02F 1/13439* (2013.01); *G09G 3/00* (2013.01); *E06B 2009/2464* (2013.01); *G02F 2203/48* (2013.01); *G09G 3/03* (2020.08)

(56) References Cited

U.S. PATENT DOCUMENTS

| | | | |
|---|---|---|---|
| 2016/0374165 A1* | 12/2016 | Tsai | H05B 45/46 |
| 2018/0004062 A1 | 1/2018 | Stanley et al. | |
| 2019/0146134 A1* | 5/2019 | Miura | G02F 1/133528 |
| | | | 349/84 |
| 2019/0353945 A1* | 11/2019 | Takahashi | G09G 3/3696 |

OTHER PUBLICATIONS

Extended European Search Report dated Oct. 8, 2021 in European Patent Application No. 19863566.4, 8 pages.

* cited by examiner

LIGHT CONTROL DEVICE

CROSS-REFERENCE TO RELATED APPLICATIONS

The present application is a continuation of International Application No. PCT/JP2019/037083, filed Sep. 20, 2019, which is based upon and claims the benefits of priority to Japanese Application No. 2018-177659, filed Sep. 21, 2018. The entire contents of all of the above applications are incorporated herein by reference.

BACKGROUND OF THE INVENTION

Field of the Invention

The present invention relates to a light control device that includes a light control sheet having a variable light transmittance.

Discussion of the Background

A light control sheet includes a light control layer and a pair of transparent electrode layers sandwiching the light control layer therebetween. When the alignment state of liquid crystal molecules included in the light control layer changes in accordance with the potential difference between the pair of transparent electrode layers, the light transmittance of the light control sheet changes accordingly.

In recent years, there have been proposed light control devices that include a light control sheet having a plurality of light control units and control the light transmittance of each of the light control units so that the light transmittances of each of the light control units are different from each other. For example, JP 2018-60128 A (PTL 1) describes a light control sheet that has a plurality of strip light control units arranged in one direction, and a light control device that controls the light transmittances of the each of the light control units so that the light transmittances of a plurality of light control units become gradually smaller in the direction in which the light control units are arranged. Such control enables a gradation expression, which is an expression in which a gradient is formed in transparency in the plane of the light control sheet.

SUMMARY OF THE INVENTION

According to an aspect of the present invention, a light control device includes a drive voltage output unit that outputs a drive voltage, a control unit that causes the drive voltage output unit to gradually increase or gradually decrease a magnitude of the drive voltage, a light control sheet including light control units connected in parallel to the drive voltage output unit and formed such that light transmittances of the light control units change according to magnitudes of voltages applied to the light control units, and a voltage dividing circuit which is connected to one of the light control units and divides the drive voltage common to each of the light control units such that the magnitude of the voltage applied to the light control unit connected to the voltage dividing circuit differs from the magnitude of the voltage applied to at least one of other light control units.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
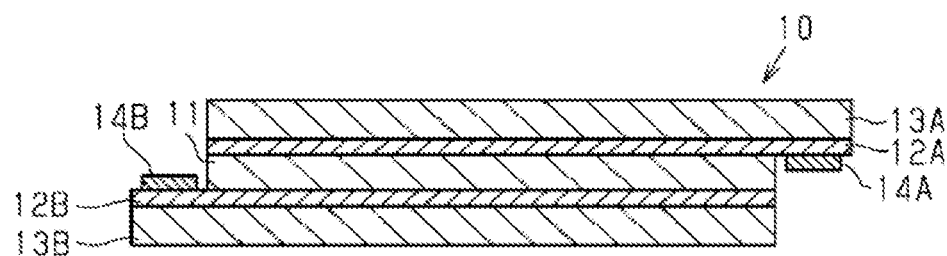
FIG. 1 is a diagram showing a cross-sectional structure of a light control sheet included in a light control device according to a first embodiment of a light control device.

The embodiments will now be described with reference to the accompanying drawings, wherein like reference numerals designate corresponding or identical elements throughout the various drawings.

First Embodiment

With reference to the drawings, a first embodiment of a light control device will be described.
<Configuration of Light Control Sheet>
A structure of a light control sheet included in the light control device of the first embodiment will be described. The light control sheet, when in use, is attached to a transparent member. The light control sheet may be attached to a flat surface or a curved surface. For example, the light control sheet may be attached to building materials such as a window glass, a partition, and a glass wall, or a vehicle member such as a window glass of an automobile.

As shown in FIG. 1, a light control sheet 10 includes a light control layer 11, a pair of transparent electrode layers composed of a first transparent electrode layer 12A and a second transparent electrode layer 12B, and a pair of transparent support layers composed of a first transparent support layer 13A and a second transparent support layer 13B. The first transparent electrode layer 12A and the second transparent electrode layer 12B sandwich the light control layer 11, and the first transparent support layer 13A and the second transparent support layer 13B sandwich the light control layer 11 and the transparent electrode layers 12A and 12B. The first transparent support layer 13A supports the first transparent electrode layer 12A, and the second transparent support layer 13B supports the second transparent electrode layer 12B.

The first transparent electrode layer 12A is connected to an external circuit via a wire extending from a first terminal unit 14A arranged on the surface of the first transparent electrode layer 12A. The second transparent electrode layer 12B is connected to an external circuit via a wire extending from a second terminal unit 14B arranged on the surface of the second transparent electrode layer 12B. The first terminal unit 14A is arranged at an end portion of the light control sheet 10, in a region where the first transparent electrode layer 12A is exposed from the light control layer 11, the second transparent electrode layer 12B, and the second transparent support layer 13B. The second terminal unit 14B is arranged at an end portion of the light control sheet 10, in a region where the second transparent electrode layer 12B is exposed from the light control layer 11, the first transparent electrode layer 12A, and the first transparent support layer 13A. The terminal units 14A and 14B constitute portions of the light control sheet 10.

The light control layer 11 contains a liquid crystal composition. The light control layer 11 is composed of, for example, a polymer network liquid crystal (PNLC), a polymer dispersed liquid crystal (PDLC), an encapsulated nematic curvilinear aligned phase (NCAP) liquid crystal, or the like. For example, a polymer network liquid crystal has a three-dimensional mesh polymer network, and holds liquid crystal molecules in voids in the polymer network. The liquid crystal molecules contained in the light control layer 11 may have, for example, positive dielectric anisotropy, and have a higher dielectric constant in a major axis direction of the liquid crystal molecules than in a minor axis direction of the liquid crystal molecules. Examples of liquid crystal molecules include those based on Schiff bases, azo types, azoxy types, biphenyls, terphenyls, benzoic acid esters, tolan types, pyrimidines, cyclohexanecarboxylic acid esters, phenylcyclohexanes, and dioxanes.

Each of the first transparent electrode layer 12A and the second transparent electrode layer 12B is a conductive transparent layer. Materials for forming the transparent electrode layers 12A and 12B include, for example, polymers including indium tin oxide (ITO), fluorine-doped tin oxide (FTO), tin oxide, zinc oxide, carbon nanotube (CNT), or poly(3,4-ethylenedioxythiophene) (PEDOT), and multilayer films including Ag alloy thin films.

Each of the first transparent support layer 13A and the second transparent support layer 13B is a transparent base material. Examples of the transparent support layers 13A and 13B include a glass substrate, a silicon substrate, or a polymer film made of polyethylene, polystyrene, polyethylene terephthalate, polyvinyl alcohol, polycarbonate, polyvinyl chloride, polyimide, polysulfone, cycloolefin polymer, triacetyl cellulose, or the like.

<Configuration of a Light Control Device>

Figure 2:
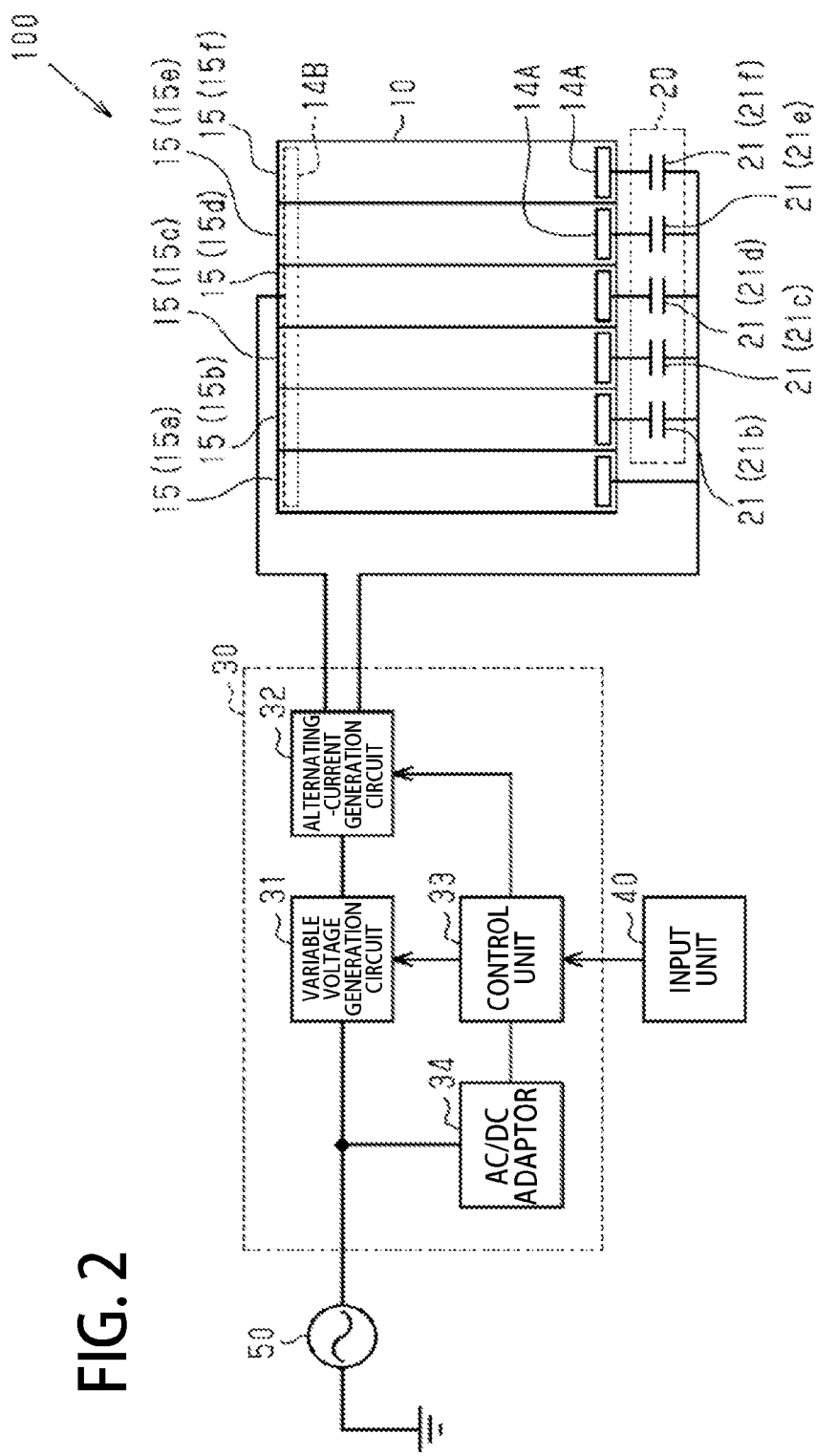
FIG. 2 is a diagram showing an electrical configuration of the light control device of the first embodiment.

As shown in FIG. 2, a light control device 100 includes the light control sheet 10, a voltage dividing unit 20, a drive unit 30, and an input unit 40.

The light control sheet 10 has a plurality of light control units 15. As for the first embodiment, a form in which the light control sheet 10 has six light control units 15 will be described as an example. In plan view from a position facing the surface of the light control sheet 10, the light control units 15 each have a rectangular strip shape extending along one direction. The plurality of light control units 15 extend in a common direction and are arranged in a direction orthogonal to the direction in which the light control units 15 extend. The six light control units 15 are arranged in the order of a light control unit 15a, a light control unit 15b, a light control unit 15c, a light control unit 15d, a light control unit 15e, and a light control unit 15f as viewed from the left in the figure.

The first transparent electrode layers 12A are provided between the adjacent light control units 15 in an insulated state. The first terminal unit 14A is provided for each of the light control units 15. The second transparent electrode layer 12B continues over the adjacent light control units 15, and on the second transparent electrode layer 12B, a second terminal unit 14B common to each of the light control units 15 is arranged. That is, discrete voltage signals for the light control units 15 are inputted to the respective first transparent electrode layers 12A, and a voltage signal in common to all of the light control units 15 is inputted to the second transparent electrode layer 12B. In a configuration where a voltage signal common to each of the light control units 15 is inputted to the second transparent electrode layer 12B, the second transparent electrode layer 12B may be provided between the adjacent light control units 15 in an insulated state.

The drive unit 30 includes a variable voltage generation circuit 31, an alternating-current generation circuit 32, a control unit 33, and an AC/DC adaptor 34. The variable voltage generation circuit 31 and the alternating-current generation circuit 32 constitute a drive voltage output unit or a drive voltage output circuit.

An alternating-current voltage is inputted to the variable voltage generation circuit 31 from an alternating-current power source 50. The variable voltage generation circuit 31 generates, from the inputted alternating-current voltage, a direct-current voltage of a magnitude in accordance with a control signal from the control unit 33. That is, the variable voltage generation circuit 31 is configured to output direct-current voltages of different magnitudes.

The alternating-current generation circuit 32 generates, from the direct-current voltage inputted from the variable voltage generation circuit 31, an alternating-current voltage with an effective value corresponding to the magnitude of the direct-current voltage and at a frequency in accordance with a control signal from the control unit 33. Specifically, the alternating-current generation circuit 32 includes a full-bridge circuit. The alternating-current generation circuit 32 generates an alternating-current voltage having a rectangular waveform by performing switching in accordance with a control signal from the control unit 33, and outputs the alternating-current voltage as the drive voltage.

The control unit 33 is a microcomputer performing software processing, for example, which controls the magnitude of the direct-current voltage generated by the variable voltage generation circuit 31, and also controls the frequency of the alternating-current voltage generated by the alternating-current generation circuit 32. The control unit 33 outputs a signal based on a signal from the input unit 40 to the variable voltage generation circuit 31, as a control signal that prescribes the magnitude of the output voltage from the variable voltage generation circuit 31. The control unit 33 also outputs a control signal to the alternating-current generation circuit 32 for causing the alternating-current generation circuit 32 to perform switching so that an alternating-current voltage at a preset frequency is generated by the alternating-current generation circuit 32.

The AC/DC adaptor 34 generates a direct-current voltage of a magnitude suited for operation of the control unit 33 from the alternating-current voltage inputted from the alternating-current power source, and outputs the direct-current voltage to the control unit 33.

The light control device 100 includes an operation unit such as a touch sensor, switches, or the like, for example. The operation unit is configured to detect an operation amount of an operation performed, on the operation unit, by the user of the light control device 100. For example, when the operation unit is a touch sensor, the amount of movement of a finger on an operation surface of the touch sensor is detected as an operation amount.

The input unit 40 outputs an electrical signal corresponding to the operation amount of the operation unit to the control unit 33. The input unit 40 includes a potentiometer, for example. That is, based on an input from the input unit 40 corresponding to the operation amount of the operation unit, the control unit 33 gradually increases or decreases the magnitude of the output voltage from the variable voltage generation circuit 31.

In the above-described configuration, the magnitude of the drive voltage output from the drive unit 30 changes depending on the operation amount of the operation unit. In the present embodiment, the magnitude of an alternating-current voltage means the magnitude of an effective value of the alternating-current voltage.

The voltage dividing unit 20 includes capacitors 21 separately connected in series to the respective light control units 15. The capacitor 21 is an example of voltage dividing circuit. Discrete capacitors 21 are provided for the respective light control units 15, and the voltage dividing unit 20 includes the plurality of capacitors 21 separately connected to the respective light control units 15. The plurality of light control units 15 are connected in parallel to the drive unit 30, and the drive voltage output from the alternating-current generation circuit 32 in the drive unit 30 is applied to series circuits of the light control units 15 and the capacitors 21. However, the plurality of light control units 15 may include a light control unit 15 to which the capacitor 21 is not connected.

In the first embodiment, the light control unit 15a is not connected to the capacitor 21, but the light control units 15b to 15f are connected to the respective capacitors 21. The capacitor 2lb is connected to the light control unit 15b, the capacitor 21c is connected to the light control unit 15c, the capacitor 21d is connected to the light control unit 15d, the capacitor 21e is connected to the light control unit 15e, and the capacitor 21f is connected to the light control unit 15f.

The capacitances of the five capacitors 21b to 21f are different from each other. The capacitances of the five capacitors 21b to 21f are set such that, when a drive voltage of any magnitude is applied to the series circuit of the light control sheet 10 and the voltage dividing unit 20, the magnitudes of the voltages applied to the light control units 15a to 15f become smaller, in the arrangement order of the light control units 15, from the light control unit 15a toward the light control unit 15f.

When the capacitor 21 is connected in series to the light control unit 15, the voltage applied to the series circuit is divided. Since the light control units 15 are equivalently similar to RC parallel circuits, the smaller the capacitances of the capacitors 21 connected to the light control units 15, the smaller the voltages applied to the light control units 15. For example, when the capacitances of the light control units 15b to 15f are uniform, specifically, when the areas of the light control units 15b to 15f in plan view are uniform, the capacitances of the capacitors 21 become smaller in the order of the capacitor 21b, the capacitor 21c, the capacitor 21d, the capacitor 21e, and the capacitor 21f.

Since the capacitor 21 is not connected to the light control unit 15a, an undivided voltage is applied to the light control unit 15a. That is, among the light control units 15b to 15f, the voltage applied to the light control unit 15a is the maximum, and the applied voltages become smaller from the light control unit 15a toward the light control unit 15f.

<Relationship Between a Voltage Applied to a Light Control Unit and Transparency>

Figure 3:
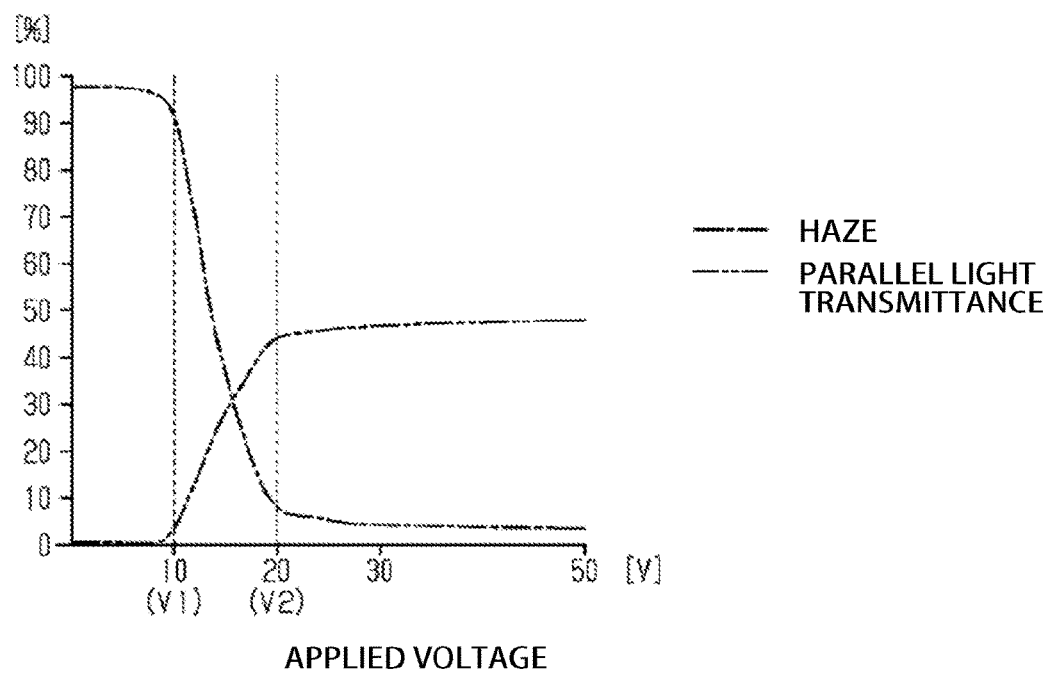
FIG. 3 is a diagram showing a relationship between voltages applied to a light control unit provided in the light control sheet of the first embodiment and parallel light transmittance and haze.

Referring to FIG. 3, the relationship between the magnitude of the voltage applied to a light control unit 15 and haze and visible light transmittance will be described.

When no voltage is applied to the transparent electrode layers 12A and 12B in each of the light control units 15, the major axis directions of the liquid crystal molecules are irregular. Accordingly, since light incident on the light control layer 11 is scattered, the light control unit 15 appears cloudy. On the other hand, when a voltage is applied between the first transparent electrode layer 12A and the second transparent electrode layer 12B, the liquid crystal molecules are aligned in accordance with the magnitude of the applied voltage, and the major axes directions of the aligned liquid crystal molecules are oriented parallel to the direction of the electric field between the transparent electrode layers 12A and 12B. As a result, light is easily transmitted through the light control layer 11, and the transparency of the light control unit 15 increases in accordance with an increase in the applied voltage.

Due to the behavior of the liquid crystal molecules, the relationship between the voltage applied to the light control unit 15 and the haze and parallel light transmittance in the light control unit 15 has characteristics shown in FIG. 3. The transparency of the light control unit 15 in the present embodiment is an index quantified as haze and parallel light transmittance, which means the higher the transparency, the smaller the haze or the larger the parallel light transmittance, and the lower the transparency, the larger the haze or the smaller the parallel light transmittance.

As shown in FIG. 3, when the applied voltage gradually increases from zero to a first threshold voltage V1, the haze and parallel light transmittance remain nearly unchanged even if the applied voltage changes. In other words, the rate of change in the haze and parallel light transmittance with respect to the applied voltage, i.e., the amount of change in the haze and parallel light transmittance per unit change in the applied voltage is small. Therefore, when the applied voltage is smaller than the first threshold voltage V1, the transparency of the light control unit 15 is the lowest and therefore the light control unit 15 is opaque.

On the other hand, when the applied voltage is in the range of the first threshold voltage V1 or more and a second threshold voltage V2 or less, the haze and parallel light transmittance significantly change in accordance with a change in the applied voltage. In other words, the rate of change in the haze and parallel light transmittance with respect to the applied voltage is large. Specifically, the higher the applied voltage, the smaller the haze and the larger the parallel light transmittance. Therefore, the transparency of the light control unit 15 significantly changes in accordance with changes in the applied voltage.

When the applied voltage exceeds the second threshold voltage V2, the haze and parallel light transmittance hardly change even when the applied voltage changes. In other words, the rate of change in the haze and parallel light transmittance with respect to the applied voltage is small. When the applied voltage exceeds the second threshold voltage V2, the transparency of the light control unit 15 is the highest.

The first threshold voltage V1 and the second threshold voltage V2 vary depending on the type or the like of the liquid crystal used in the light control layer 11. In the example shown in FIG. 3, the first threshold voltage V1 is 10V and the second threshold voltage V2 is 20V.

<Drive Modes>

Figure 4:
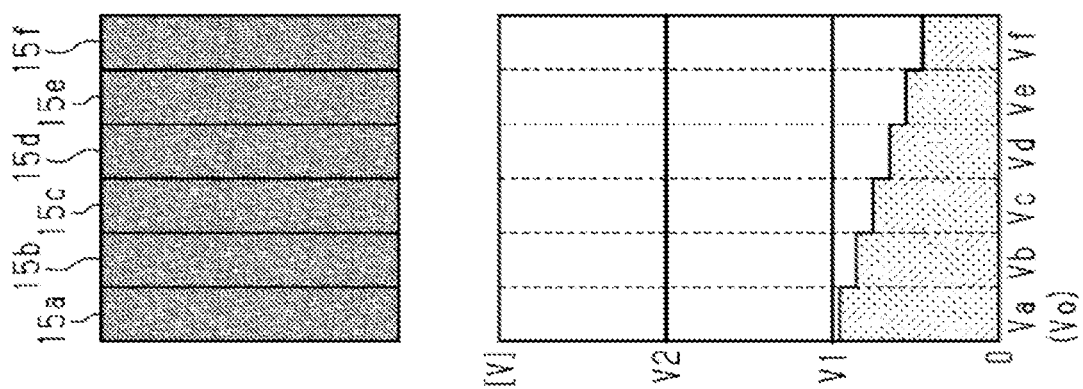
FIG. 4 is a diagram schematically showing the magnitudes of transparencies and applied voltages to a plurality of light control units in the light control device of the first embodiment.
Figure 5:
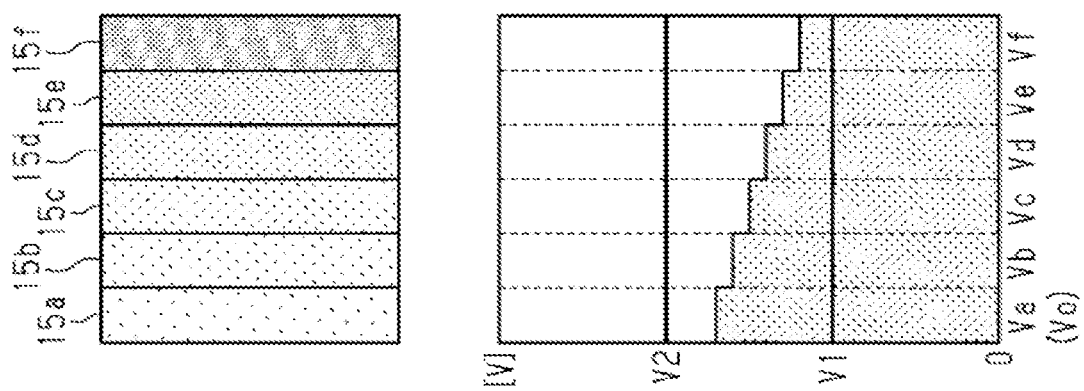
FIG. 5 is a diagram schematically showing the magnitudes of transparencies and applied voltages to the plurality of light control units in the light control device of the first embodiment.
Figure 6:
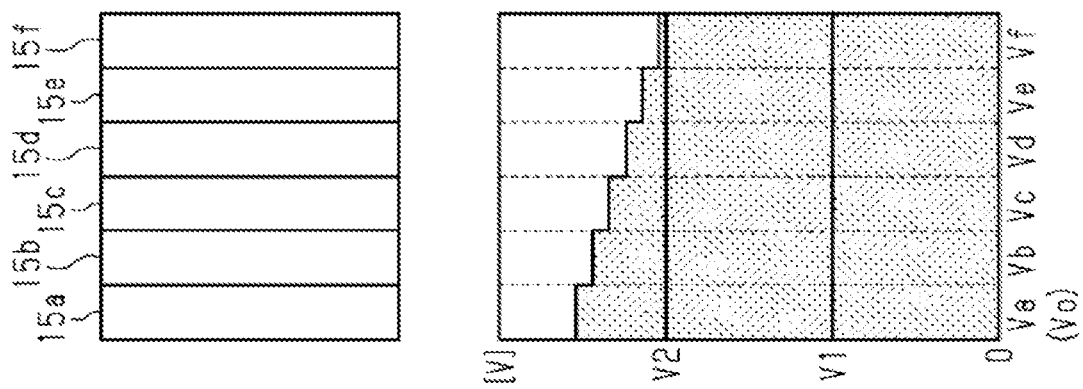
FIG. 6 is a diagram schematically showing the magnitudes of transparencies and applied voltages to the plurality of light control units in the light control device of the first embodiment.

The light control sheet 10 has drive modes of: an opaque mode in which all the light control units 15 are opaque with no visible differences in transparency; a gradation mode in which there are visible differences in transparency among the plurality of light control units 15; and a transparent mode in which all of the light control units 15 are transparent with no visible differences in transparency. With reference to FIGS. 4 to 6, each mode will be described. In FIGS. 4 to 6, the transparencies of the light control units 15 are indicated by the density of dots, and the magnitudes of the voltages applied to the light control units 15 are indicated in bar graph form.

With reference to FIG. 4, the opaque mode will be described. When the drive unit 30 outputs the drive voltage Vo, voltages of equal to or less than Vo are applied to the light control units 15a to 15f. Then, as stated above, an applied voltage Va to the light control unit 15a, an applied voltage Vb to the light control unit 15b, an applied voltage Vc to the light control unit 15c, an applied voltage Vd to the light control unit 15d, an applied voltage Ve to the light control unit 15e, and an applied voltage Vf to the light control unit 15f become smaller in this order. In the present embodiment, since the capacitor 21 is not connected to the light control unit 15a, the maximum value of the voltages applied to the light control units 15a to 15f, that is, the magnitude of the applied voltage Va to the light control unit 15a is equal to the magnitude of the drive voltage Vo.

As shown in FIG. 4, when the maximum applied voltage Va to the light control units 15a to 15f is smaller than the first threshold voltage V1, the applied voltages Va to Vf to the light control units 15a to 15f are all smaller than the first threshold voltage V1. In other words, when the applied voltage Va is smaller than the first threshold voltage V1, a voltage difference Vdf, that is, the difference between the maximum value and the minimum value of the voltages applied to the light control units 15a to 15f, is smaller than the first threshold voltage V1 (0<Vdf<V1). That is, the voltage difference Vdf is the difference between the applied voltage Va to the light control unit 15a and the applied voltage Vf to the light control unit 15f.

As shown in FIG. 3, when the applied voltage is smaller than the first threshold voltage V1, there is almost no difference in haze and parallel light transmittance of the light control units 15, even if there is a difference in the magnitude of the applied voltage. Therefore, when the applied voltage Va is smaller than the first threshold voltage V1, the light control units 15a to 15f are all opaque and the differences in transparency among the light control units 15a to 15f will not be recognized by the user. In this manner, when the applied voltage Va is smaller than the first threshold voltage V1, the light control sheet 10 is in the opaque mode.

An example of a state in the gradation mode will be described with reference to FIG. 5. As shown in FIG. 5, the capacitances of the capacitors 21 are set such that, when the maximum applied voltage Va to the light control units 15a to 15f is equal to or greater than a predetermined value within the range of the first threshold voltage V1 or more and the second threshold voltage V2 or less, all the applied voltages Va to Vf to the light control units 15a to 15f are in the range of the first threshold voltage V1 or more and the second threshold voltage V2 or less. In other words, when the applied voltage Va is equal to or greater than the predetermined value, the voltage difference Vdf among the light control units 15a to 15f is equal to or less than the difference between the second threshold voltage V2 and the first threshold voltage V1 (0<Vdf≤V2−V1). For example, when the applied voltage Va is the second threshold voltage V2, each of the applied voltages Va to Vf to the light control units 15a to 15f is in the range of the first threshold voltage V1 or more and the second threshold voltage V2 or less.

As shown in FIG. 3, when the applied voltage is in the range of the first threshold voltage V1 or more and the second threshold voltage V2 or less, the haze and parallel light transmittance of the light control unit 15 changes in accordance with the magnitude of the applied voltage. When the applied voltage Va is equal to or greater than the predetermined value in the range of the first threshold voltage V1 or more and the second threshold voltage V2 or less, the applied voltages Va to Vf to the light control units 15a to 15f are different from each other in the range of the first threshold voltage V1 or more to the second threshold voltage V2 or less, and become gradually smaller from the applied voltage Va toward the applied voltage Vf. Therefore, the transparencies of the light control units 15a to 15f are different from each other, and the transparencies gradually decrease from the light control unit 15a toward the light control unit 15f. That is, the differences in transparency among the light control units 15a to 15f will be recognized by the user, and the light control sheet 10 enters the gradation mode.

With reference to FIG. 6, the transparent mode will be described. When the smallest applied voltage Vf to the light control units 15a to 15f exceeds the second threshold voltage V2, the applied voltages Va to Vf to the light control units 15a to 15f are all greater than the second threshold voltage V2.

As shown in FIG. 3, when the applied voltage is greater than the second threshold voltage V2, there is almost no difference in haze and parallel light transmittance of the light control units 15, even if there is a difference in the magnitude of the applied voltage. Therefore, when the applied voltage Vf exceeds the second threshold voltage V2, the light control units 15a to 15f are all transparent and the differences in transparency among the light control units 15a to 15f will not be recognized by the user. In this manner, when the applied voltage Vf is greater than the second threshold voltage V2, the light control sheet 10 enters the transparent mode.

Figure 7A:
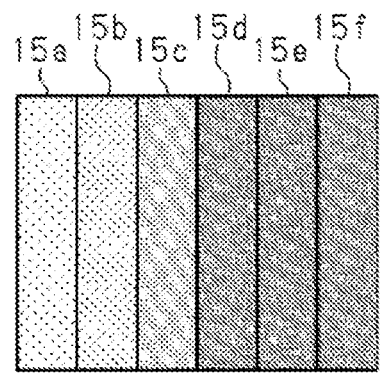
FIG. 7A is a diagram schematically showing a part of a process of changes in transparency of the plurality of light control units in the light control device of the first embodiment.

The transition of the gradation mode will be described with reference to FIGS. 7A to 7C. The gradation mode includes a state in which the transparencies of some of the light control units 15a to 15f are different from the others and a state in which the transparencies of all the light control units 15a to 15f are different from each other as described above with reference to FIG. 5.

Among the light control units 15a to 15f, in the light control unit 15 where the applied voltage is in the range of the first threshold voltage V1 or more and the second threshold voltage V2 or less, the transparency changes in accordance with the magnitude of the applied voltage. Even when the applied voltages Va to Vf to the light control units 15a to 15f change as the drive voltage from the drive unit 30 changes, the relationship in magnitude among the applied voltages Va to Vf remains unchanged and the voltages become smaller from the applied voltage Va toward the applied voltage Vf. Therefore, in the gradation mode, the directions of the gradients of transparencies of the light control units 15a to 15f are uniform, and the transparencies of the light control units 15 become lower from the light control unit 15a to the light control unit 15f so as to be equal to or smaller than the transparency of the light control unit 15 on the left side as viewed in the figure.

For example, a case will be described in which the drive voltage from the drive unit 30 gradually increases, and the transition of drive modes takes place from the opaque mode through the gradation mode to the transparent mode.

In the opaque mode, all the transparencies of the light control units 15a to 15f are the lowest. From this state, the applied voltages Va to Vf increase as the drive voltage increases, and when the applied voltage reaches the first threshold voltage V1 or higher, the transparencies increases in order from the light control unit 15a. For example, when the applied voltages Va, Vb, and Vc are equal to or greater than the first threshold voltage V1, and the applied voltages Vd, Ve, and Vf are less than the first threshold voltage V1, the light control units 15d, 15e, and 15f are opaque as in the opaque mode as shown in FIG. 7A. On the other hand, the transparencies of the light control units 15a, 15b, and 15c are higher than that in the opaque mode, and become lower in the order of the light control units 15a, 15b, and 15c.

Figure 7B:
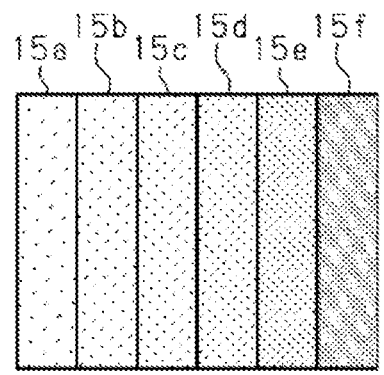
FIG. 7B is a diagram schematically showing a part of the process of changes in transparency of the plurality of light control units in the light control device of the first embodiment.
Figure 7C:
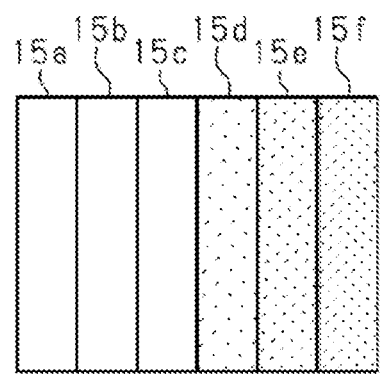
FIG. 7C is a diagram schematically showing a part of the process of changes in transparency of the plurality of light control units in the light control device of the first embodiment.

When the drive voltage further increases and all the applied voltages Va to Vf are in the range of the first threshold voltage V1 or more and the second threshold voltage V2 or less, all the transparencies of all the light control units 15a to 15f become higher than that in the opaque mode as shown in FIG. 7B. In addition, the transparencies of the light control units 15a to 15f are in different states from each other in accordance with the magnitudes of the applied voltages Va to Vf. That is, the transparencies become lower in the order of the light control units 15a, 15b, 15c, 15d, 15e, and 15f.

When the drive voltage further increases, the transparencies becomes the highest in the light control unit 15 where an applied voltage exceeds the second threshold voltage V2. For example, when the applied voltages Va, Vb, and Vc are greater than the second threshold voltage V2 and the applied voltages Vd, Ve, and Vf are in the range of the first threshold voltage V1 or more and the second threshold voltage V2 or less, the light control units 15a, 15b, and 15c are transparent and have the same transparencies as those in the transparent mode, as shown in FIG. 7C. On the other hand, the transparencies of the light control units 15d, 15e, and 15f are lower than that in the transparent mode, and the transparencies become lower in the order of the light control units 15d, 15e, and 15f.

When the drive voltage further increases and all the applied voltages Va to Vf exceed the second threshold voltage V2, the transparencies of the light control units 15a to 15f become the highest and enters the transparent mode.

In the case of the drive voltage from the drive unit 30 gradually decreasing, the transition of the drive modes takes places from the transparent mode through the gradation mode to the opaque mode such that the transparencies of the light control units 15 become gradually lower.

In the light control device 100 of the present embodiment, the transparencies of the light control units 15 continuously change from the opaque mode through the gradation mode to the transparent mode or from the transparent mode through the gradation mode to the opaque mode, according to the gradual increase or gradual decrease of the drive voltage. Among the gradation modes, the transparencies of each of the light control units 15 continuously change. In other words, the transparencies of each of the light control units 15 change continuously between the state where all the light control units 15 are opaque and the state where all the light control units 15 are transparent, while going through the state where differences in transparency occur among the plurality of light control units 15. In particular, during the transition of transparency in the gradation mode, a high transparency portion or a low transparency portion in the light control sheet 10 appears to continuously move in the plane of the light control sheet 10.

The transition of the drive modes between the opaque mode, the gradation mode, and the transparent mode, and the timing and speed of the transition of transparencies of the light control units 15a to 15f in the gradation mode are controlled by the timing and speed of change in the magnitude of the drive voltage output from the drive unit 30, and such a change in the drive voltage is controlled by the control unit 33. Based on a signal from the input unit 40, the control unit 33 controls the change in the drive voltage in accordance with an amount of operation performed by the user on the operation unit. For example, when the operation unit is a touch sensor, the control unit 33 controls the change in the drive voltage in accordance with the moving direction and movement amount of a finger on the operation surface of the touch sensor. This causes the transition of the drive modes of the light control sheet 10 in accordance with the operation amount.

<Effects>

Effects of the light control device 100 of the first embodiment will be described. In the light control device 100, the drive unit 30 outputs, to the plurality of light control units 15, a drive voltage common to each of the light control units 15, and the voltage dividing unit 20 produces differences in the voltages applied to the plurality of light control units 15. That is, the voltages applied to the plurality of light control units 15 change stepwise due to the series connection of the capacitors 21 to some of the light control units 15 and the differences in capacitance among the plurality of capacitors 21. Therefore, it is possible to express gradation with a simple circuit configuration, as compared to the case where power sources and circuits for generating a drive voltage are provided for each of the light control units 15. Therefore, it is also possible to prevent the portion for storing the circuit in the light control device 100 from becoming large.

The light control units 15 have characteristics that the rate of change in light transmittance and haze with respect to the applied voltage is small in a voltage region that is less than the first threshold voltage V1 and in a voltage region that exceeds the second threshold voltage V2, and that the rate of change is large in a voltage region that is in the range of the first threshold voltage V1 or more and the second threshold voltage V2 or less. In the configuration in which the voltages applied to the light control units 15 are made different by connection of the capacitors 21, there are always differences in applied voltage among the plurality of light control units 15. By controlling the voltage regions that include the voltages applied to the light control units 15 between the voltage region with a large rate of change and the voltage region with a small rate of change, it is possible to increase or decrease the differences in transparency among the plurality of light control units 15 even if there is no change in the state where there are differences in applied voltage among the plurality of light control units 15.

Specifically, the capacitances of the capacitors 21 are set such that there can be a state in which all the voltages applied to the light control units 15 are in the voltage region with a large rate of change which is in the range of the first threshold voltage V1 or more and the second threshold voltage V2 or less. When all the voltages applied to the light control units 15 are in the range of the first threshold voltage V1 or more and the second threshold voltage V2 or less, it is possible to increase the differences in transparency among the plurality of light control units 15, so that the user can easily recognize the gradient of transparency in the light control sheet 10. That is, the user can easily recognize the gradation mode. In addition, the transparencies of the plurality of light control units 15 can be made different from each other in accordance with the differences in applied voltage, which allows an expression with the number of gradations corresponding to the number of the light control units 15.

On the other hand, there can be a state in which all the voltages applied to the light control units 15 are included in a range smaller than the first threshold voltage V1, which is the voltage region with a small rate of change. In this case, since the differences in transparency among the plurality of light control units 15 can be made smaller, the opaque mode is realized in which all of the plurality of light control units 15 are opaque, and thus the transparencies of all of the plurality of light control units 15 are recognized as being equivalent. There can be a state in which all the voltages applied to the light control units 15 are included in the range exceeding the second threshold voltage V2, which is the voltage region with a small rate of change. Also, in this case, since the differences in transparency among the plurality of light control units 15 can be made smaller, the transparent mode is realized in which all of the plurality of light control units 15 are transparent, and thus the transparencies of all of the plurality of light control units 15 are recognized as being equivalent.

As described above, using the characteristics of the ratio of change in the light control units 15 allows implementation of the three drive modes: opaque mode, gradation mode, and transparent mode. This allows a variety of expressions in the light control sheet 10. These characteristics of the light control units 15 can be favorably realized by using a liquid crystal as a material for the light control layer 11.

In the first embodiment, the capacitances of the capacitors 21 are set such that the voltages applied to the light control units 15 become smaller from the light control unit 15a provided at one end toward the light control unit 15f provided at the other end, in the direction in which the plurality of light control units 15 are arranged. Therefore, in the gradation mode, it is possible to provide an expression in which the transparencies of the light control units 15 change from the light control unit 15a at one end toward the light control unit 15f at the other end in the arrangement order of the light control units 15. By the transition of the drive modes between the opaque mode, the gradation mode, and the transparent mode, a natural expression in which the transparency in the light control sheet 10 changes over time, like a single curtain, is possible, and the designability of the light control sheet 10 is enhanced.

As described above, according to the light control device 100 of the first embodiment, advantageous effects listed below can be obtained.

(1) The drive voltage common to each of the light control units 15 is divided by the capacitors 21 to produce differences in applied voltages among the plurality of light control units 15. Therefore, it is possible to express gradation with a simple circuit configuration.

(2) The plurality of capacitors 21 separately connected to the respective light control units 15 include the capacitors 21 having different capacitances from each other. According to this, it is possible to control the differences in applied voltage among the plurality of light control units 15 by the differences in capacitance among the plurality of capacitors 21, in other words, by the differences in the voltage dividing ratio between the capacitor and the light control unit in each of a plurality of sets of capacitor and light control unit. Therefore, it is possible to correctly control the differences in applied voltage among the plurality of light control units 15 with a simple configuration.

(3) In each of the light control units 15, the rate of change of light transmittance and haze with respect to the applied voltage is relatively small when the applied voltage is smaller than the first threshold voltage V1 and when the applied voltage exceeds the second threshold voltage V2, and is relatively large when the applied voltage is in the range of the first threshold voltage or more and the second threshold voltage or less. Therefore, by using the voltage regions having different rates of change as the voltage regions that include the voltages applied to the light control units 15, it is possible to increase or decrease the differences in transparency among the plurality of light control units 15 in a condition where there are differences in applied voltage among the plurality of light control units 15.

In addition, since the light control layer 11 contains a liquid crystal composition, the light control units 15 in which the light transmittance changes according to the magnitude of the applied voltage is favorably obtained, and in particular, the light control units 15 having the voltage regions in which the magnitude of the rate of change are different is favorably obtained.

(4) When the maximum value of the voltages applied to the plurality of light control units 15 is smaller than the first threshold voltage V1, the voltage difference Vdf exceeds zero and is less than the first threshold voltage V1, and when the maximum value of the applied voltages is equal to or larger than a predetermined value in the range of the first threshold voltage V1 or more and the second threshold voltage V2 or less, the voltage difference Vdf is equal to or smaller than the difference between the first threshold voltage V1 and the second threshold voltage V2. According to this, there can be a state in which all the voltages applied to the plurality of light control units 15 are included in the voltage region having a large rate of change. Therefore, the difference in transparency among the plurality of light control units 15 can be easily made larger, whereby the user can easily recognize a gradation expression. There can also be a state in which all the voltages applied to the plurality of light control units 15 are included in the voltage region with a small rate of change. Therefore, it is possible to provide an expression with small differences in transparency among the plurality of light control units 15 where, for example, all of the plurality of light control units 15 are transparent or opaque. This allows a variety of expressions in the light control sheet.

(5) Since the voltage dividing unit 20 is configured such that the magnitudes of the applied voltages change among the plurality of light control units 15 in the arrangement order of the plurality of light control units 15, it is possible to express gradation in which the transparencies of the light control units 15 gradually change in the arrangement order of the plurality of light control units 15. This allows a gradation expression.

(6) The voltage dividing unit 20 is configured such that the voltages applied to the light control units 15 become smaller from the light control unit 15a provided at one end toward the light control unit 15f provided at the other end, in the direction in which the plurality of light control units 15 are arranged. According to this, it is possible to provide a gradation expression in which the transparency changes from one end toward the other end in which the plurality of light control units 15 are arranged. This allows a natural expression like a single curtain, thereby enhancing the designability of the light control sheet 10.

(7) By gradual increase or gradual decrease in the drive voltage, the transparencies of the plurality of light control units 15 continuously change between a first state in which all the light control units 15 are opaque and a second state in which all the light control units 15 are transparent, having a third state in which the plurality of light control units 15 have different transparencies between the first state and the second state. According to this, it is possible to provide a dynamic expression for the transparency of the light control sheet 10 depending on the changes in the transparencies of the light control units 15, thereby enhancing the designability of the light control sheet 10.

Second Embodiment

A second embodiment of a light control device will be described with reference to FIGS. 8 to 11. The following description is focused on differences between the second embodiment and the first embodiment, and components similar to those of the first embodiment are denoted by the same reference numerals and description thereof is omitted.

<Configuration of a Light Control Device>

Figure 8:
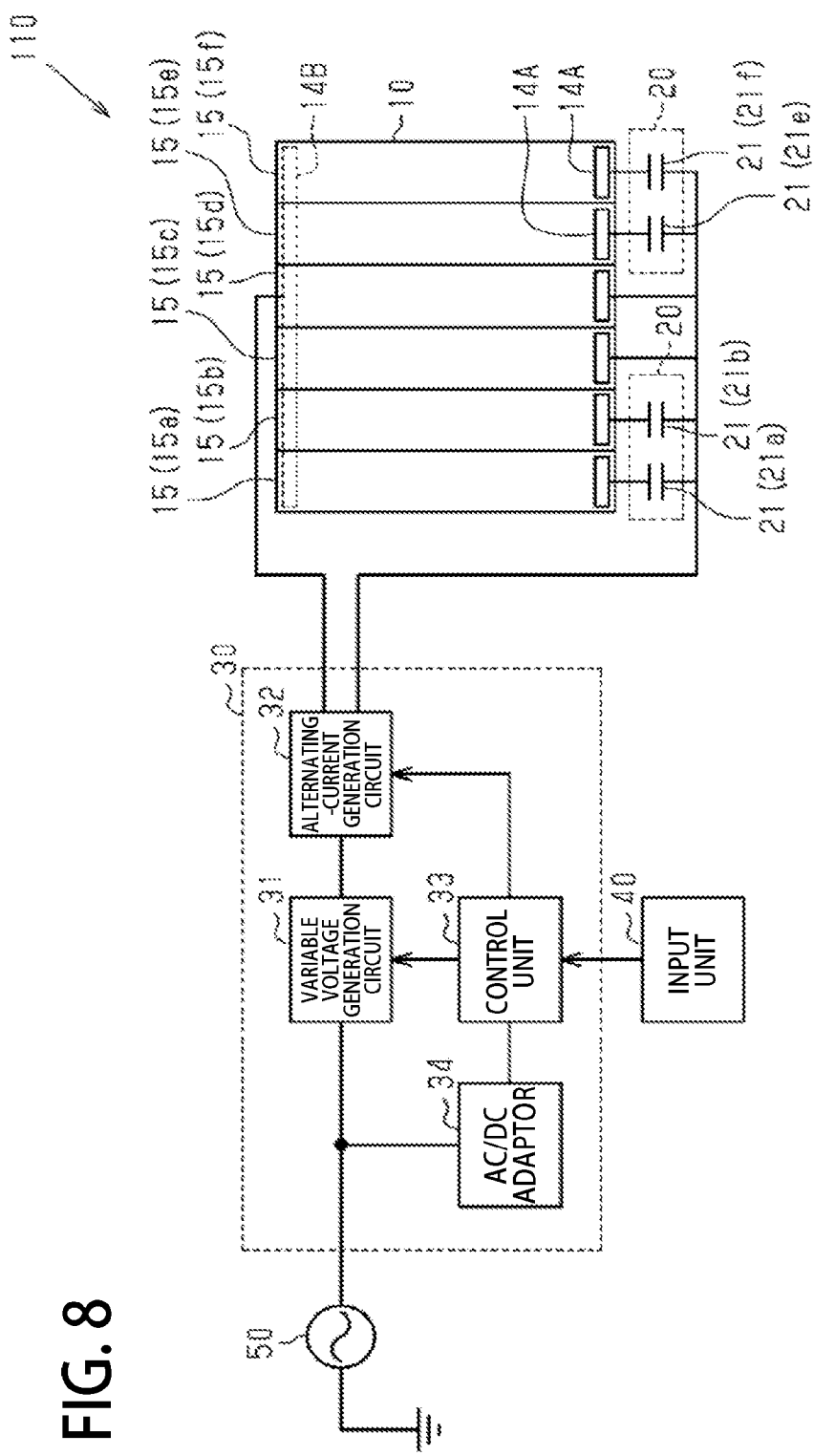
FIG. 8 is a diagram showing an electrical configuration of a light control device according to a second embodiment of a light control device.

As shown in FIG. 8, a light control device 110 of the second embodiment is different from the first embodiment in a configuration of connection between a plurality of capacitors 21 included in a voltage dividing unit 20 and a light control sheet 10, and in the relationship in magnitude of capacitance among the plurality of capacitors 21. The light control sheet 10, the drive unit 30, and the input unit 40 are configured in the same manner as those in the first embodiment.

The capacitors 21 in the voltage dividing unit 20 are respectively provided to each of the light control units 15, and the plurality of capacitors 21 are separately connected to each of the light control units 15. In the second embodiment, a light control unit 15c and a light control unit 15d are not connected to any of the capacitor 21, but the light control units 15a, 15b, 15e, and 15f are separately connected to the respective capacitors 21. A capacitor 21a is connected to the light control unit 15a, a capacitor 21b is connected to the light control unit 15b, a capacitor 21e is connected to the light control unit 15e, and a capacitor 21f is connected to the light control unit 15f.

The capacitances of the four capacitors 21a, 21b, 21e, and 21f are set such that, when a drive voltage of an optional magnitude is applied to a series circuit of the light control sheet 10 and the voltage dividing unit 20, the magnitudes of the voltages applied to the light control units 15a to 15f become smaller from the light control unit 15 in the center toward the light control units 15 at both ends in the direction in which the light control units 15 are arranged. That is, the capacitances of the capacitors 21 are set such that the voltages applied to the light control units 15 become smaller from the light control unit 15c provided in the center to the light control unit 15a provided at one end in the arrangement of the light control units 15, and such that the voltages applied to the light control units 15 become smaller from the light control unit 15d provided in the center toward the light control unit 15f provided at the other end in the arrangement of the light control units 15.

For example, when the capacitances of the light control units 15b to 15f are uniform, the capacitance of the capacitor 21a is smaller than the capacitance of the capacitor 21b, and the capacitance of the capacitor 21f is smaller than the capacitance of the capacitor 21e. The capacitances of the capacitor 21b and the capacitor 21e are equal, and the capacitances of the capacitor 21a and the capacitor 21f are equal.

Since the capacitor 21 is not connected to the light control units 15c and 15d, an undivided voltage is applied to the light control units 15c and 15d. That is, among the light control units 15b to 15f, the voltages applied to the light control units 15c and 15d are the highest, and the applied voltages become smaller from the light control unit 15c toward the light control unit 15a, and the applied voltages become smaller from the light control unit 15d toward the light control unit 15f. The voltages applied to the light control unit 15c and the light control unit 15d are equal to each other, the voltages applied to the light control unit 15b and the light control unit 15e are equal to each other, and the voltages applied to the light control unit 15a and the light control unit 15f are equal to each other.

<Drive Modes>

Figure 9:
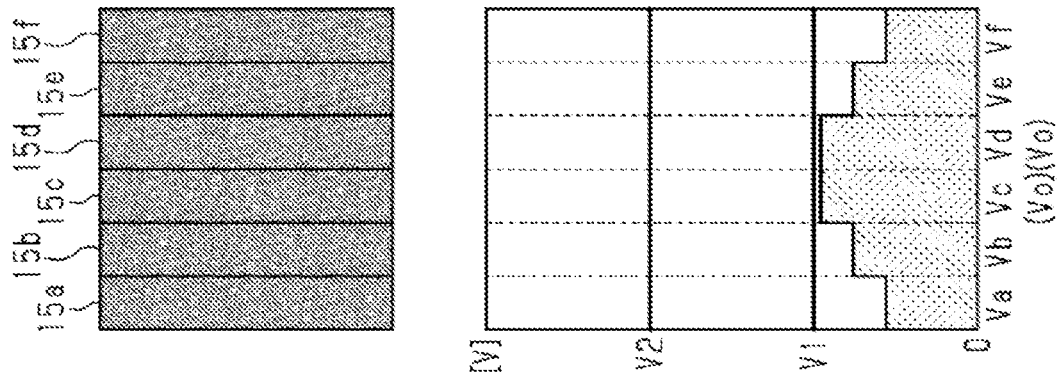
FIG. 9 is a diagram schematically showing the magnitudes of transparencies and applied voltages to the plurality of light control units in the light control device of the second embodiment.
Figure 10:
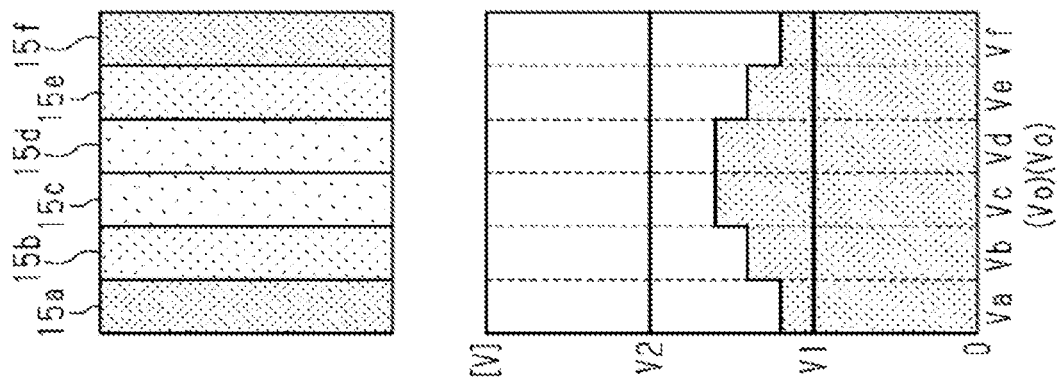
FIG. 10 is a diagram schematically showing the magnitudes of transparencies and applied voltages to the plurality of light control units in the light control device of the second embodiment.
Figure 11:
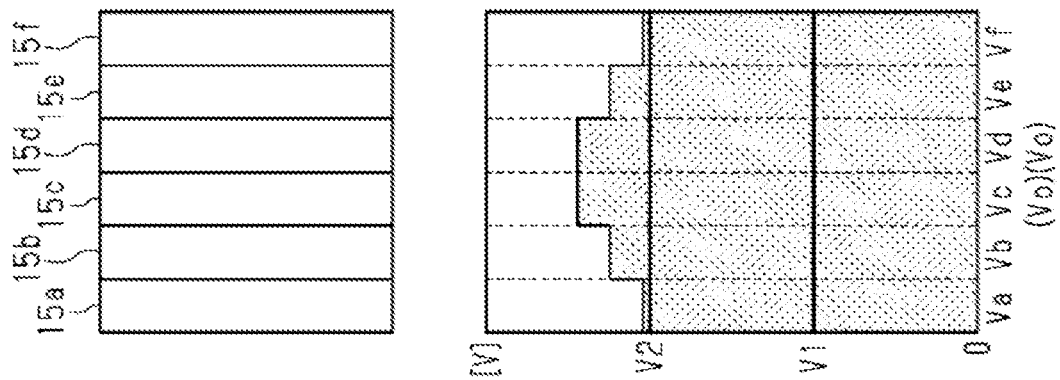
FIG. 11 is a diagram schematically showing the magnitudes of transparencies and applied voltages to the plurality of light control units in the light control device of the second embodiment.

Also, in the second embodiment, the light control sheet 10 has drive modes of: an opaque mode in which all the light control units 15 are opaque with no visible differences in transparency; a gradation mode in which there are visible differences in transparency among the plurality of light control units 15; and a transparent mode in which all the light control units 15 are transparent with no visible differences in transparency. With reference to FIGS. 9 to 11, each mode will be described.

With reference to FIG. 9, the opaque mode will be described. When the drive unit 30 outputs the drive voltage Vo, voltages of equal to or less than Vo are applied to the light control units 15a to 15f. Then, as stated above, an applied voltage Vc to the light control unit 15c, an applied voltage Vb to the light control unit 15b, and an applied voltage Va to the light control unit 15a become smaller in this order, and an applied voltage Vd to the light control unit 15d, an applied voltage Ve to the light control unit 15e, and an applied voltage Vf to the light control unit 15f become smaller in this order. In the present embodiment, since the capacitor 21 is not connected to the light control units 15c and 15d, the maximum value of the voltages applied to the light control units 15a to 15f, that is, the magnitudes of the applied voltages Vc and Vd to the light control units 15c and 15d are equal to the magnitude of the drive voltage Vo.

As shown in FIG. 9, when the maximum applied voltages Vc and Vd to the light control units 15a to 15f are smaller than a first threshold voltage V1, the applied voltages Va to Vf to the light control units 15a to 15f are all smaller than the first threshold voltage V1. In other words, when the applied voltages Vc and Vd are smaller than the first threshold voltage V1, a voltage difference Vdf which is a difference between the maximum value and the minimum value of the voltages applied to the light control units 15a to 15f is smaller than the first threshold voltage V1 (0<df<V1). That is, the voltage difference Vdf is a difference between the applied voltages Vc and Vd to the light control units 15c and 15d and the applied voltages Va and Vf to the light control units 15a and 15f.

When the applied voltages Vc and Vd are smaller than the first threshold voltage V1, the light control units 15a to 15f are all opaque and the differences in transparency among the light control units 15a to 15f will not be recognized by the user. In this manner, when the applied voltages Vc and Vd are smaller than the first threshold voltage V1, the light control sheet 10 enters the opaque mode.

An example of a state included in the gradation mode will be described with reference to FIG. 10. As shown in FIG. 10, the capacitances of the capacitors 21 are set such that, when the maximum applied voltages Vc and Vd to the light control units 15a to 15f are equal to or greater than a predetermined value within the range of the first threshold voltage V1 or more and the second threshold voltage V2 or less, all the applied voltages Va to Vf to the light control units 15a to 15f are in the range of the first threshold voltage V1 or more and the second threshold voltage V2 or less. In other words, when the applied voltages Vc and Vd are equal to or greater than the predetermined value, the voltage difference Vdf among the light control units 15a to 15f is equal to or less than the difference between the second threshold voltage V2 and the first threshold voltage V1 (0<Vdf≤V2−V1).

In this case, the transparencies gradually decrease from the light control unit 15c toward the light control unit 15a, and the transparencies gradually decrease from the light control unit 15d toward the light control unit 15f. That is, the differences in transparency among the light control units 15a to 15f will be recognized by the user, and the light control sheet 10 enters the gradation mode.

With reference to FIG. 11, the transparent mode will be described. When the smallest applied voltages Va and Vf to the light control units 15a to 15f exceed the second threshold voltage V2, the applied voltages Va to Vf to the light control units 15a to 15f are all greater than the second threshold voltage V2. In this case, the light control units 15a to 15f are all transparent and the differences in transparency among the light control units 15a to 15f will not be recognized by the user. In this manner, when the applied voltages Va and Vf are greater than the second threshold voltage V2, the light control sheet 10 enters the transparent mode.

Also, in the second embodiment, even when the applied voltages Va to Vf of the light control units 15a to 15f change according to the change in the drive voltage from the drive unit 30, the relationship in magnitude among the applied voltages Va to Vf remains unchanged and the voltages become smaller from the applied voltages Vc and Vd toward the applied voltages Va and Vf. Therefore, in the gradation mode, the directions of gradients of transparency of the light control units 15a to 15f are uniform, and the transparencies of the light control units 15 become lower from the light control units 15c and 15d in the center to the light control units 15a and 15f at the ends. In addition, since the applied voltage Vc and the applied voltage Vd are equal, the applied voltage Vb and the applied voltage Ve are equal, and the applied voltage Va and the applied voltage Vf are equal, the transparencies of the light control unit 15c and the light control unit 15d are equal, the transparencies of the light control unit 15b and the light control unit 15e are equal, and the transparencies of the light control unit 15a and the light control unit 15f are equal.

Therefore, for example, when the drive voltage from the drive unit 30 gradually increases and the transition of the drive modes takes place from the opaque mode through the gradation mode to the transparent mode, firstly, the transparencies of the light control units 15c and 15d in the center start to increase, then the transparencies of the light control units 15b and 15e start to increase, and finally the transparencies of the light control units 15a and 15f start to increase. When all the transparencies of the light control units 15a to 15f become the highest, the entire light control sheet 10 becomes transparent.

As described above, also in the light control device 110 of the second embodiment, due to gradual increase or gradual decrease of the drive voltage, the transparencies of the light control units 15 continuously change while going through a state in which there are differences in transparency among the plurality of light control units 15, between a state in which all the light control units 15 are transparent and a state in which all the light control units 15 are opaque.

<Effects>

Advantageous effects of the light control device 110 of the second embodiment will be described. In the light control device 110 of the second embodiment, as in the first embodiment, there are differences caused in the applied voltages among the plurality of light control units 15 due to the serial connection of the capacitors 21 to some of the light control units 15 and the differences in capacitance among the plurality of capacitors 21. Therefore, it is possible to express gradation with a simple circuit configuration, as compared to a configuration in which a power source and circuits for generating a drive voltage are provided to each of the light control units 15. In addition, using the characteristics of the ratio of change in the light transmittance and haze of the light control units 15 allows implementation of three drive modes of the opaque mode, the gradation mode, and the transparent mode.

In the second embodiment, the capacitances of the capacitors 21 are set such that the applied voltages become smaller from the light control units 15c and 15d provided in the center to the light control units 15a and 15f provided at both ends in the direction in which the plurality of light control units 15 are arranged. Therefore, in the gradation mode, it is possible to provide an expression in which the transparencies of the light control units 15 change from the light control units 15c and 15d in the center toward the light control units 15a and 15f at both ends, in the arrangement order of the light control units 15. By the transition of the drive modes between the opaque mode, the gradation mode, and the transparent mode, a characteristic expression in which the transparency changes over time, like a double curtain, is possible, and the designability of the light control sheet 10 is enhanced.

As described above, according to the light control device 110 of the second embodiment, in addition to the advantageous effects (1) to (5) and (7) of the first embodiment, the following advantageous effects can be obtained.

(8) The voltage dividing unit 20 is configured such that the applied voltages to the light control units 15 become smaller from the light control units 15c and 15d provided in the center toward the light control units 15a and 15f provided at both ends, in the direction in which the plurality of light control units 15 are arranged. According to this, it is possible to provide a gradation expression in which the transparency changes from the center toward both ends in which the plurality of light control units 15 are arranged. This allows a characteristic expression like a double curtain, thereby enhancing the designability of the light control sheet 10.

(Modifications)

The embodiments described above can be implemented in manners modified as follows.

The capacitances of the plurality of light control units 15 may not be uniform. For example, the areas of the plurality of light control units 15 in plan view may not be uniform. In this case, the relationship in magnitude of capacitance among the plurality of capacitors 21 may not necessarily coincide with the relationship in magnitude of applied voltage among the plurality of light control units 15. The capacitances of the light control units 15 to which the capacitors 21 are connected and the capacitances of the capacitors 21 to which the respective light control units 15 are connected, may be determined so that a desired relationship in magnitude is formed in the applied voltage among the plurality of light control units 15. The capacitors 21 may be separately connected to all of the light control units 15.

The number of the light control units 15 included in the light control sheet 10 is not limited as long as it is two or more. The shape of the light control units 15 in plan view is not limited to a rectangular strip shape, and the plurality of light control units 15 may not be arranged in one direction. For example, the light control sheet 10 may have a plurality of light control units 15 having a square shape in plan view, and the plurality of light control units 15 may be arranged in a matrix.

The relationship in magnitude of applied voltage among the plurality of light control units 15 is not limited to the relationship in which the magnitude of the applied voltage changes in the arrangement order of the plurality of light control units 15. There may be generated differences in applied voltage among the plurality of light control units 15 by providing elements that divide the drive voltage, such as the capacitors 21. That is, in the gradation mode, the transparencies of the light control units 15 does not have to change according to the arrangement order of the light control units 15. For example, in a configuration in which the plurality of light control units 15 are arranged in the matrix, when the relationship in magnitude of applied voltage among the plurality of light control units 15 is set regardless of the arrangement direction of the light control units 15, it is possible to produce a mosaic expression in the gradation mode.

The control unit 33 may gradually increase or gradually decrease the drive voltage to be output by the drive unit 30 based on the operation to the operation unit, and the amount of operation of the operation unit may not be reflected in the change in the magnitude of the drive voltage, that is, transition between the opaque mode, the gradation mode, and the transparent mode. The operation unit may not be configured to be capable of detecting the operation amount. For example, the operation unit may be a switch for instructing switching between the opaque mode, the gradation mode, and the transparent mode, and may be configured to detect only the presence or absence of an operation.

The control unit 33 is not limited to performing software processing for all the processing executed by the control unit 33. For example, the control unit 33 may include a dedicated hardware circuit (e.g., application specific integrated circuit (ASIC)) that performs hardware processing for at least a part of the processing executed by the control unit 33. Specifically, the control unit 33 may be configured as 1) one or more processors acting according to computer programs (software), 2) one or more dedicated hardware circuits that execute at least a part of various types of processing, or 3) processing circuitry that includes a combination of the foregoing processor(s) and dedicated hardware circuit(s). The processor may include a CPU and a memory, such as a RAM and a ROM, and the memory may store program codes or instructions that are configured for the CPU to execute the processing. The memory, that is, the computer-readable medium, includes every available medium that is accessible from general-purpose or dedicated computers.

The voltage dividing circuit is not limited to the capacitors 21, and may be a circuit which is connected to one of the plurality of light control units 15 to divide the drive voltage, and makes the magnitude of the voltage applied to this connected light control unit 15 different from the magnitude of the voltage applied to at least one of other light control units 15.

In the embodiments described above, the drive unit 30 generates a drive voltage from the alternating-current voltage inputted from the alternating-current power source 50. Without being limited to this, the drive unit 30 may generate a drive voltage that is an alternating-current voltage, from the direct-current voltage inputted from a direct-current power source. In short, the drive unit 30 may be configured to output alternating-current voltages of different effective values from each other as the drive voltage. The size of the drive voltage may be controlled by the control unit 33.

The light control sheet 10 may include other layers in addition to the light control layer 11, the transparent electrode layers 12A and 12B, and the transparent support layers 13A and 13B. Examples of the additional layers include layers having a UV barrier function or the like, layers for protecting the light control layer 11 and the transparent electrode layers 12A and 12B, and layers improving strength or characteristics such as heat resistance of the light control sheet 10.

The light control sheet 10 may include a pair of orientation layers that are located between the light control layer 11 and the transparent electrode layers 12A and 12B and that sandwich the light control layer 11. The orientation layers are layers that control the orientation of liquid crystal molecules included in the light control layer 11. When no drive voltage is applied, the liquid crystal molecules are oriented in the normal direction of the transparent electrode layers 12A and 12B. In a configuration with the orientation layers, the transparencies of the light control units 15 decreases as the voltages applied to the light control units 15 increases.

The light control layer 11 may include a dye that has a predetermined color and does not hinder movement of the liquid crystal molecules according to a magnitude of the voltage applied to the light control layer 11. Such a configuration achieves the light control sheet 10 having the predetermined color.

If it is possible to realize the light control units 15 whose light transmittance changes according to the magnitudes of the applied voltages, the light control layer 11 may be made of a material different from liquid crystal.

EXAMPLES

Specific examples of the foregoing light control device will be described.

Example 1

A light control device of Example 1 is a light control device corresponding to the first embodiment.

<Configuration of Light Control Sheet>

A light control sheet 10 having six light control units 15a to 15f was formed using polymer network liquid crystal for a light control layer 11. The relationship between the applied voltage and the haze and parallel light transmittance in the light control sheet 10 has the characteristics shown in FIG. 3. A first threshold voltage V1 is 10v, and a second threshold voltage V2 is 20V. The light control units 15a to 15f have a rectangular strip shape in plan view, and the six light control units 15a to 15f are arranged in one direction. That is, the light control units 15a to 15f are arranged in the arrangement shown in FIG. 2. However, the widths of the light control units 15a to 15f are not uniform, that is, the areas of the light control units 15a to 15f in plan view are not uniform. The sizes of the light control units 15a to 15f in plan view are as listed below. As described below, the areas of the light control units 15a and 15f at both ends are larger than the areas of the light control units 15b, 15c, 15d, and 15e.

The light control unit 15a: 58 mm×255 mm
The light control unit 15b: 47 mm×255 mm
The light control unit 15c: 47 mm×255 mm
The light control unit 15d: 47 mm×255 mm
The light control unit 15e: 47 mm×255 mm
The light control unit 15f: 58 mm×255 mm <Transition of Applied Voltages>

A light control device 100 was configured by not connecting the capacitor 21 to the light control unit 15a, and separately connecting the capacitors 21 each having different capacitances from each other to the respective light control units 15b to 15f. By changing the magnitude of a drive voltage Vo applied to the series circuits of the light control units 15 and the capacitors 21, the magnitudes of the voltages applied to the light control units 15a to 15f were measured. The drive voltage Vo is an alternating-current voltage of a rectangular wave having a frequency of 50 Hz. Table 1 shows the capacitances of the capacitors 21 connected to the light control units 15b to 15f, the magnitudes of the drive voltage Vo, and the magnitudes of the voltages applied to the light control units 15a to 15f.

TABLE 1

|  | Capacitor capacitance [uF] | Applied voltage [Vrms] | | | | | | |
| --- | --- | --- | --- | --- | --- | --- | --- | --- |
|  |  | Vo: 10.1 | Vo: 15.1 | Vo: 20.1 | Vo: 25.1 | Vo: 30.1 | Vo: 35.0 | Vo: 40.5 |
| Light control unit 15a | 0 | 10.1 | 15.1 | 20.1 | 25.1 | 30.1 | 35.0 | 40.5 |
| Light control unit 15b | 474 | 8.8 | 13.1 | 17.4 | 21.7 | 26.0 | 30.3 | 34.9 |
| Light control unit 15c | 200 | 7.6 | 11.3 | 15.0 | 18.6 | 22.3 | 26.0 | 30.0 |
| Light control unit 15d | 122 | 6.5 | 9.8 | 12.9 | 15.9 | 19.0 | 22.2 | 25.6 |
| Light control unit 15e | 88 | 5.6 | 8.5 | 10.8 | 13.9 | 16.6 | 19.3 | 22.3 |
| Light control unit 15f | 100 | 5.1 | 7.8 | 10.3 | 12.8 | 15.3 | 17.7 | 20.5 |

As shown in Table 1, the voltages applied to the light control units 15a to 15f become smaller from the light control unit 15a toward the light control unit 15f regardless of the magnitudes of the drive voltage Vo. When the drive voltage Vo is 10.1V, the maximum value of the voltages applied to the light control units 15a to 15f is 10.1V and the minimum value is 5.1V. Therefore, it is suggested that there is a state in which, when the drive voltage Vo is less than 10V, all the voltages applied to the light control units 15a to 15f are less than the first threshold voltage V1.

When the drive voltage Vo is 20.1V, the maximum value of the voltages applied to the light control units 15a to 15f is 20.1V and the minimum value is 10.3V. Therefore, it is suggested that there is a state in which, when the drive voltage Vo is in the range of 10V or more and 20V or less, all the voltages applied to the light control units 15a to 15f are in the range of the first threshold voltage V1 or more and the second threshold voltage V2 or less.

When the drive voltage Vo is 40.5V, the maximum value of the voltages applied to the light control units 15a to 15f is 40.5V and the minimum value is 20.5V Therefore, it is suggested that there is a state in which, when the drive voltage Vo exceeds 20V, all the voltages applied to the light control units 15a to 15f are larger than the second threshold voltage V2.

Therefore, according to the light control device 100 of Example 1, it is possible to implement the three drive modes of the opaque mode, the gradation mode, and the transparent mode, and it is also possible to produce an expression in the gradation mode in which the transparency changes according to the arrangement order of the light control units 15, from the light control unit 15a at one end toward the light control unit 15f at the other end, in the direction in which the light control units 15 are arranged.

Example 2

A light control device of Example 2 is a light control device corresponding to the second embodiment. A configuration of a light control sheet 10 in Example 2, that is, a layer configuration of the light control sheet 10 and layout and size of light control units 15 are similar to those of Example 1.

<Transition of Applied Voltages>

The light control device 110 was configured such that the light control units 15c and 15d are not connected to the capacitor 21, and the light control units 15a, 15b, 15e, and 15f are separately connected to each of the capacitors 21. By changing the magnitude of a drive voltage Vo applied to the series circuits of the light control units 15 and the capacitors 21, the magnitudes of the voltages applied to the light control units 15a to 15f were measured. The drive voltage Vo is an alternating-current voltage of a rectangular wave having a frequency of 50 Hz. Table 2 shows the capacitances of the capacitors 21 separately connected to the respective light control units 15a to 15f, the magnitudes of the drive voltage Vo, and the magnitudes of the voltages applied to the light control units 15a to 15f.

TABLE 2

| | Capacitor capacitance [uF] | Applied voltage [Vrms] | | | | | | |
|---|---|---|---|---|---|---|---|---|
| | | Vo: 10.1 | Vo: 15.1 | Vo: 20.1 | Vo: 25.1 | Vo: 30.1 | Vo: 35.0 | Vo: 40.5 |
| Light control unit 15a | 100 | 5.1 | 7.8 | 10.3 | 12.8 | 15.3 | 17.7 | 20.5 |
| Light control unit 15b | 200 | 7.6 | 11.3 | 15.0 | 18.6 | 22.3 | 26.0 | 30.0 |
| Light control unit 15c | 0 | 10.1 | 15.1 | 20.1 | 25.1 | 30.1 | 35.0 | 40.5 |
| Light control unit 15d | 0 | 10.1 | 15.1 | 20.1 | 25.1 | 30.1 | 35.0 | 40.5 |
| Light control unit 15e | 200 | 7.6 | 11.3 | 15.0 | 18.6 | 22.3 | 26.0 | 30.0 |
| Light control unit 15f | 100 | 5.1 | 7.8 | 10.3 | 12.8 | 15.3 | 17.7 | 20.5 |

As shown in Table 2, the voltages applied to the light control units 15a to 15f become smaller from the light control unit 15c toward the light control unit 15a, and become smaller from the light control unit 15d toward the light control unit 15f, regardless of the magnitudes of the drive voltage Vo.

When the drive voltage Vo is 10.1V, the maximum value of the voltages applied to the light control units 15a to 15f is 10.1V and the minimum value is 5.1V. Therefore, it is suggested that there is a state in which, when the drive voltage Vo is less than 10V, all the voltages applied to the light control units 15a to 15f are less than the first threshold voltage V1.

When the drive voltage Vo is 20.1V, the maximum value of the voltages applied to the light control units 15a to 15f is 20.1V and the minimum value is 10.3V. Therefore, it is suggested that there is a state in which, when the drive voltage Vo is in the range of 10V or more and 20V or less, all the voltages applied to the light control units 15a to 15f are in the range of the first threshold voltage V1 or more and the second threshold voltage V2 or less.

When the drive voltage Vo is 40.5V, the maximum value of the voltages applied to the light control units 15a to 15f is 40.5V and the minimum value is 20.5V Therefore, it is suggested that there is a state in which, when the drive voltage Vo exceeds 20V, all the voltages applied to the light control units 15a to 15f are larger than the second threshold voltage V2.

Therefore, according to the light control device 110 of Example 2, it is possible to implement the three drive modes of the opaque mode, the gradation mode, and the transparent mode, and it is possible to produce an expression in the gradation mode in which the transparency changes according to the arrangement order of the light control units 15, from the light control units 15c and 15d in the center to the light control units 15a and 15f at both ends in the direction in which the light control units 15 are arranged.

The present application addresses the following. To achieve the gradation expression on the light control sheet, it is necessary to control the magnitudes of voltages applied to each of the light control units such that the potential difference between the transparent electrode layers changes stepwise between the plurality of light control units. Accordingly, the light control device described in PTL 1 is provided with a power source for each of the light control units, and from the different power sources, AC voltages having different magnitudes are applied to each of the light control units.

However, providing a power source for each of the light control units means that a circuit for generating AC voltages suitable for driving the light control units is provided for each of the light control units. As a result, the configuration of a circuit unit for each of the light control units becomes more complicated and the circuit unit becomes larger. Further, when a circuit unit is provided for each of the light control units, a control circuit becomes necessary to collectively control the plurality of circuit units. Therefore, it is inevitable that the circuit configuration of the light control device becomes complicated and a portion for storing the circuit in the light control device becomes larger.

An aspect of the present invention is to provide a light control device that is capable of expressing gradation with a simple circuit configuration.

A light control device includes: a drive voltage output unit configured to output a drive voltage; a control unit configured to cause the drive voltage output unit to gradually increase or gradually decrease a magnitude of the drive voltage; and a light control sheet that has a plurality of light control units connected in parallel to the drive voltage output unit, light transmittances of the light control units changing in accordance with magnitudes of voltages applied to the light control units. The light control device further includes a voltage dividing circuit that is connected to one of the plurality of light control units and is configured to divide the drive voltage common to each of the light control units to make the magnitude of the voltage applied to the light control unit connected to the voltage dividing circuit different from the magnitude of the voltage applied to at least one of other light control units.

According to the above-described configuration, the drive voltage is output common to each of the light control units from the drive voltage output unit to the plurality of light control units, and the voltage dividing circuit produces differences in the voltages applied to the plurality of light control units. Therefore, it is possible to express gradation with a simple circuit configuration as compared with a configuration in which a circuit for generating a drive voltage is provided individually for each of the light control units.

According to the embodiments of the present invention, it is possible to express gradation with a simple circuit configuration in a light control device.

Obviously, numerous modifications and variations of the present invention are possible in light of the above teachings. It is therefore to be understood that within the scope of the appended claims, the invention may be practiced otherwise than as specifically described herein.

What is claimed is:
1. A light control device, comprising:
a drive voltage output circuit configured to output a drive voltage;
a control circuit configured to cause the drive voltage output circuit to gradually increase or gradually decrease a magnitude of the drive voltage;
a light control sheet including a plurality of light control units connected in parallel to the drive voltage output circuit and formed such that light transmittances of the light control units change according to magnitudes of voltages applied to the light control units; and a voltage dividing circuit, of a plurality of voltage dividing circuits, which is connected to one of the light control units and is configured to divide the drive voltage common to each of the light control units such that the magnitude of the voltage applied to the light control unit connected to the voltage dividing circuit differs from the magnitude of the voltage applied to at least one of other light control units, wherein another light control unit of the light control units is not connected to any of the voltage dividing circuits.

2. The light control device according to claim 1, wherein each of the plurality of voltage dividing circuits is separately connected to a corresponding light control unit of the light control units, each of the voltage dividing circuits is a capacitor connected in series to the corresponding light control unit, and the voltage dividing circuits include capacitors with capacitances different from each other.

3. The light control device according to claim 1, wherein, in each of the light control units, when a rate of change in light transmittance with respect to an applied voltage is defined as a target rate of change, the target rate of change with the applied voltage being in a range of from a first threshold voltage to a second threshold voltage is greater than the target rate of change with the applied voltage less than the first threshold voltage and greater than the target rate of change with the applied voltage exceeding the second threshold voltage.

4. The light control device according to claim 3, wherein, when the drive voltage output circuit outputs the drive voltage of an optional magnitude, a difference between a maximum value and a minimum value of voltages applied to the light control units is a voltage difference, when the maximum value is less than the first threshold voltage, the voltage difference exceeds zero and is less than the first threshold voltage, and when the maximum value is equal to or greater than a predetermined value in the range of from the first threshold voltage to the second threshold voltage, the voltage difference exceeds zero and is equal to or less than the difference between the first threshold voltage and the second threshold voltage.

5. The light control device according to claim 1, wherein each of the plurality of voltage dividing circuits is separately connected to a corresponding light control unit of the light control units, the light control units are formed in one direction, and the voltage dividing circuits are configured such that magnitudes of voltages applied to the light control units change in accordance with an order of the light control units being positioned.

6. The light control device according to claim 5, wherein the voltage dividing circuits are configured such that the voltages applied to the light control units become smaller from the light control unit positioned at one end toward the light control unit positioned at an other end, in a direction in which the light control units are formed.

7. The light control device according to claim 5, wherein the voltage dividing circuits are configured such that the voltages applied to the light control units become smaller from the light control unit positioned in a center toward the light control units positioned at both ends, in the direction in which the light control units are formed.

8. The light control device according to claim 1, wherein the light control sheet includes a first state in which all the light control units are opaque, a second state in which all the light control units are transparent, and a third state in which the light control units includes the light control units with light transmittances different from each other, and when the control circuit gradually increases or gradually decreases the magnitude of the drive voltage, the light transmittances of each of the light control units continuously change between the first state and the second state such that the third state is included between the first state and the second state.

9. The light control device according to claim 1, wherein the light control sheet includes a light control layer including a liquid crystal composition, a pair of transparent electrode layers sandwiching the light control layer therebetween, and a pair of transparent support layers sandwiching the light control layer and the pair of transparent electrode layers therebetween.

10. The light control device according to claim 1, wherein the another light control unit of the light control units that is not connected to any of the voltage dividing circuits is positioned at one end of the light control units.

11. The light control device according to claim 1, wherein the another light control unit of the light control units that is not connected to any of the voltage dividing circuits is positioned toward a center of the light control units.

* * * * *